US012691337B2

(12) United States Patent
Kuntimaddi et al.

(10) Patent No.: US 12,691,337 B2
(45) Date of Patent: Jul. 28, 2026

(54) GOLF BALL INCORPORATING TRANSITION COLOR REGION AND METHOD OF MAKING SAME

(71) Applicant: Acushnet Company, Fairhaven, MA (US)

(72) Inventors: Manjari Kuntimaddi, Raynham, MA (US); Matthew F. Hogge, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/174,843

(22) Filed: Feb. 27, 2023

(65) Prior Publication Data

US 2024/0017129 A1 Jan. 18, 2024

Related U.S. Application Data

(62) Division of application No. 17/539,911, filed on Dec. 1, 2021.

(60) Provisional application No. 63/125,040, filed on Dec. 14, 2020.

(51) Int. Cl.

*A63B 37/00* (2006.01)
*B05D 1/02* (2006.01)
*B05D 1/36* (2006.01)

(52) U.S. Cl.

CPC .......... *A63B 37/00223* (2020.08); *B05D 1/02* (2013.01); *B05D 1/36* (2013.01); *A63B 37/0006* (2013.01)

(58) Field of Classification Search

CPC ...................... A63B 37/00223; A63B 37/0006
See application file for complete search history.

(56) References Cited

U.S. PATENT DOCUMENTS

| | | | | | |
|---|---|---|---|---|---|
| 676,506 | A | * | 6/1901 | Knight et al. | A63B 43/008 D21/708 |
| 1,382,615 | A | * | 6/1921 | Bate | A63B 45/00 15/210.1 |
| 4,878,674 | A | * | 11/1989 | Newcomb | A63B 37/0083 473/200 |
| 5,029,870 | A | * | 7/1991 | Concepcion | A63B 37/0026 473/378 |
| D375,338 | S | * | 11/1996 | Stiefel | D21/709 |

(Continued)

OTHER PUBLICATIONS

Jeff Patterson, Stripe It!, Jun. 1, 2014, Golf Digest, 1 page screen cap.

*Primary Examiner* — Michael D Dennis
*Assistant Examiner* — Matthew B Stanczak
(74) *Attorney, Agent, or Firm* — Steven Landolfi, Jr.

(57) ABSTRACT

A golf ball comprising a subassembly such as a cover and a coating layer disposed entirely about an outer surface of the subassembly; wherein the coating layer has a first color region, a second color region, and a transition color region that is transitionally disposed between the first color region and the second color region. The first color region has a first color appearance; the second color region has a second color appearance that is different than the first color appearance; and the transition color region has a transitional color appearance that is comprised of the first color appearance and the second color appearance. The transitional color region may be disposed circumferentially about the outer surface of the cover.

1 Claim, 5 Drawing Sheets

(56) References Cited

U.S. PATENT DOCUMENTS

D377,816 S * 2/1997 Stiefel .......... D21/709
D381,720 S * 7/1997 Stiefel .......... D21/709
D381,721 S * 7/1997 Stiefel .......... D21/709
5,651,741 A * 7/1997 Masutani .......... A63B 37/0022 473/200
5,743,818 A * 4/1998 Maruoka .......... A63B 45/00 473/378
D411,599 S * 6/1999 Sullivan .......... D21/709
D412,543 S * 8/1999 Sullivan .......... D21/709
D414,229 S * 9/1999 Sohn .......... D21/709
5,984,806 A * 11/1999 Sullivan .......... A63B 37/0062 473/378
D429,510 S * 8/2000 Sullivan .......... D21/709
6,245,386 B1 * 6/2001 Felker .......... A63B 37/0022 427/407.1
6,319,563 B1 * 11/2001 Skrabski .......... B05B 13/0442 427/407.1
D452,720 S * 1/2002 Blankenship .......... D21/708
6,390,938 B1 * 5/2002 Asakura .......... A63B 37/0016 473/378
6,511,384 B1 * 1/2003 Villacorta .......... A63B 69/3688 473/200
7,063,747 B2 * 6/2006 Lastowka .......... B05B 15/68 118/679
7,691,005 B2 * 4/2010 Mitsuba .......... A63B 37/0022 D21/708
8,308,587 B1 * 11/2012 Morgan .......... A63B 37/0003 473/378
8,403,768 B2 * 3/2013 Aittola .......... A63B 69/3688 473/200
D691,679 S * 10/2013 Barrett .......... D21/708
8,979,678 B2 * 3/2015 Hogge .......... A63B 43/06 473/378
D775,288 S * 12/2016 Spiegler .......... D21/780
D892,241 S * 8/2020 Enderle .......... D21/709
D892,953 S * 8/2020 Nicely .......... D21/708
D903,795 S * 12/2020 Enderle .......... D21/709
D944,347 S * 2/2022 Hocknell .......... D21/708
11,571,708 B2 * 2/2023 Huang .......... B05D 5/065
11,759,812 B2 * 9/2023 Huang .......... B05B 13/0228 118/313
D1,016,943 S * 3/2024 Düllmann .......... D21/709
2001/0031672 A1 * 10/2001 Cao .......... B05D 7/02 473/378
2002/0032083 A1 * 3/2002 Ogg .......... A63B 37/0004 473/378
2002/0077197 A1 * 6/2002 Endo .......... A63B 37/00223 473/378
2005/0215355 A1 * 9/2005 Nagasaki .......... A63B 45/00 473/371
2006/0293113 A1 * 12/2006 Pelz .......... A63B 69/3688 473/280
2008/0096691 A1 * 4/2008 Kang .......... A63B 69/3655 473/280
2008/0248897 A1 * 10/2008 Morgan .......... A63B 37/004 473/371
2010/0093469 A1 * 4/2010 Kim .......... A63B 57/10 473/409
2010/0144468 A1 * 6/2010 Tarao .......... A63B 37/00221 473/378
2010/0151971 A1 * 6/2010 Mydlack .......... A63B 45/00 473/378
2010/0261554 A1 * 10/2010 Nagasawa .......... A63B 43/008 473/378
2010/0298069 A1 * 11/2010 Goodwin .......... A63B 37/00221 473/378
2010/0317464 A1 * 12/2010 Nakagawa .......... A63B 43/008 473/378
2012/0021851 A1 * 1/2012 Hogge .......... A63B 37/0004 473/373
2012/0028726 A1 * 2/2012 Aittola .......... A63B 69/3688 473/378
2012/0071275 A1 * 3/2012 Williams .......... A63B 69/3655 473/378
2012/0152775 A1 * 6/2012 Hogge .......... A63B 43/008 206/315.9
2012/0237689 A1 * 9/2012 Lin .......... A63B 37/0039 118/62
2012/0283043 A1 * 11/2012 Fitchett .......... A63B 37/00221 473/378
2013/0072324 A1 * 3/2013 Tarao .......... C09D 133/066 473/378
2013/0316849 A1 * 11/2013 Zieske .......... A63B 37/0074 473/371
2013/0324310 A1 * 12/2013 Leech .......... A63B 37/00221 473/378
2013/0324323 A1 * 12/2013 Yontz .......... B29C 45/1671 264/254
2014/0018193 A1 * 1/2014 Morgan .......... A63B 37/0076 473/378
2014/0066229 A1 * 3/2014 Kuntimaddi .......... A63B 37/0022 473/378
2014/0073462 A1 * 3/2014 Morgan .......... A63B 37/00223 473/378
2015/0165278 A1 * 6/2015 Oberg .......... A63B 45/02 347/225
2015/0251059 A1 * 9/2015 Comeau .......... A63B 37/008 427/157
2015/0273281 A1 * 10/2015 Ohno .......... B05B 3/02 427/425
2016/0158605 A1 * 6/2016 Morgan .......... A63B 43/008 473/378
2018/0207490 A1 * 7/2018 Hong .......... A63B 37/0075
2021/0178230 A1 * 6/2021 Moon .......... A63B 37/0075
2021/0228945 A1 * 7/2021 Loper .......... A63B 37/00373
2022/0184461 A1 * 6/2022 Kuntimaddi .......... A63B 37/0074
2022/0212219 A1 * 7/2022 Huang .......... B05B 13/0278
2024/0017129 A1 * 1/2024 Kuntimaddi .......... A63B 45/00
2024/0269518 A1 * 8/2024 Kuntimaddi .......... A63B 37/0006

* cited by examiner

GOLF BALL INCORPORATING TRANSITION COLOR REGION AND METHOD OF MAKING SAME

CROSS-REFERENCE TO RELATED APPLICATIONS

This application is a divisional of U.S. patent application Ser. No. 17/539,911, filed Dec. 1, 2021, which claims the benefit of U.S. Provisional Application No. 63/125,040, filed Dec. 14, 2020, both of which are hereby incorporated herein in their entirety.

FIELD OF THE INVENTION

The field of the invention broadly comprises golf balls having an overall transitional color appearance; and the methods for making same.

BACKGROUND OF THE INVENTION

Both professional and amateur golfers use multi-piece, solid golf balls today. Basically, a two-piece solid golf ball includes a solid core protected by a cover. The core is made of a natural or synthetic rubber such as polybutadiene, styrene butadiene, or polyisoprene. The cover may be made of a variety of materials including ethylene acid copolymer ionomers, polyamides, polyesters, polyurethanes, and/or polyureas.

Three-piece, four-piece, and even five-piece balls have become more popular over the years. Golfers are playing with multi-piece balls for several reasons, including availability of lower-cost materials and the development of new manufacturing technologies which make it possible and cost-effective to produce a multi-layered golf ball having unique desirable resulting performance characteristics. In multi-layered golf balls, each of the core, intermediate layer and cover can be single or multi-layered, and properties such as hardness, modulus, compression, resilience, core diameter, intermediate layer thickness and cover thickness can be preselected and coordinated to target play characteristics such as spin, initial velocity and feel of the resulting golf ball.

While conventional golf balls are white, some golfers enjoy distinguishing themselves on the course by playing a golf ball having a unique visual appearance. Accordingly, golf ball manufacturers have applied localized distinctive colored indicia/markings such as trademarks, symbols, logos, designs, letters, identification numbers, model names and/or on the golf ball's surface using, for example, inked prefab printing plates/stamps and/or pad-printing, ink-jet printing, dye-sublimation, or other suitable printing methods.

Meanwhile, coloring agents/colorants such as pigments, dyes, tints, inks and the like have also been incorporated in golf balls in several ways. In some applications, the coloring agents/colorants have been mixed/blended directly into a golf ball layer master batch before setting or curing which then becomes an inner core, intermediate layer and/or outermost cover layer after final cure. Additionally, colored coating layers have been applied about the outer surface of golf ball layers via numerous methods such as spraying, dipping, rolling, wiping, brushing, thermoforming, masking, transferring, and/or surface penetration by a colorant into a golf ball layer/coating.

In fact, to date, golf ball manufacturers have produced a number of golf balls having unique, patentably distinct overall golf ball color appearances. Nevertheless, there remains a need for a golf ball wherein the overall golf ball color appearance transitions from a first color appearance within a first color region into a second color appearance within a second color region (and vice versa) via a transition color region that is transitionally disposed between the first color region and the second color region without any visually apparent boundary/border between color regions.

The present golf balls of the invention and methods of making same address and solve this need without negatively impacting important golf ball properties and characteristics and meanwhile can be implemented cost effectively within existing golf ball manufacturing processes.

SUMMARY OF THE INVENTION

Accordingly, golf balls of the invention have an overall golf ball color appearance that is comprised of two differing color regions which transition into and from each other within a transition color region that is transitionally disposed therebetween without any visually apparent boundary/border between color regions.

In one embodiment, a golf ball of the invention comprises a core, a cover and a coating layer disposed entirely about an outer surface of the cover. The coating layer has a first color region having a first color appearance; a second color region having a second color appearance that is different than the first color appearance; and a transition color region that is transitionally disposed between the first color region and the second color region and has a transitional color appearance comprised of the first color appearance and the second color appearance.

As used herein, the term "transitionally disposed" means that the transition color region transitions from and into each of the first color region and the second color region without being defined by any visually apparent boundary/border there between. And yet, the color appearances within each color region can be measured using a color analysis device such as a spectrophotometer, whereby color appearance is represented in terms of tristimulus colorimetry as discussed more fully further below.

The transition color region may be disposed circumferentially about the outer surface of the cover.

In a particular embodiment, the first color appearance is at least partially overlaid with the second color appearance within the transition color region and the second color appearance is at least partially overlaid with the first color appearance within the transition color region.

In one specific embodiment, the cover comprises a plurality of dimples, and the coating layer is applied onto the outer surface of the cover such that more dimples of the plurality are located within the transition color region of the coating layer than are located within each of the first color region and the second color region of the coating layer.

In another specific embodiment, the cover comprises a plurality of dimples, and the coating layer is applied onto the outer surface of the cover such that more dimples of the plurality are located within each of the first color region and the second color region of the coating layer than are located within the transition color region of the coating layer.

In yet another specific embodiment, the cover comprises a plurality of dimples, and the coating layer is applied onto the outer surface of the cover such that an equal number of dimples of the plurality are located within each of the first color region, the second color region, and the transition color region of the coating layer.

Alternatively, the coating layer may be applied onto the cover such that at least one dimple is partially located in the transition color region of the coating layer and partially located in one of the first color region or the second color region.

In another embodiment, the cover comprises a plurality of dimples, and the coating layer is applied onto the cover such that greater than one row of dimples and up to seven rows of dimples are located within the transition color region of the coating layer. In another particular embodiment, the cover comprises a plurality of dimples, and the coating layer is applied onto the cover such that at least four rows of dimples are located within each of the first color region and the second color region of the coating layer.

In one embodiment, the cover has at least one transition dimple that is located within the transition color region and has a transition dimple surface that is coated with the first color appearance and the second color appearance such that the first color appearance and the second color appearance are juxtaposed on the transition dimple surface. In a specific such embodiment, the transition dimple has a first side and a second side; wherein a first pole of the first color region is closer to the first side than the second side; and wherein a second pole of the second color region is closer to the second side than the first side; and wherein the first color appearance is located on the second side and the second color appearance is located on the first side.

In another embodiment, a first pole of the golf ball is included in the first color region; an opposing pole of the golf ball is included in the second color region; and an equator of the golf ball is disposed between the first pole and the second pole and is at least partially located in the transition color region.

In this regard, the "equator" is the line that extends circumferentially about the outer surface of the golf ball and is equi-distant between the first pole and the second pole, and does not necessarily align with the parting line of the golf ball.

In a specific embodiment, the cover has a third color appearance that is opaque, translucent, clear-colored, or combinations thereof and the first color appearance and/or the second color appearance is clear-colored, translucent, or at least partially transparent; such that the transitional color appearance is comprised of each of the first color appearance, the second color appearance, and at least a portion of the third color appearance.

In another specific embodiment, the transition color region is transitionally disposed about an equator of the golf ball asymmetrically; and the cover has a third color appearance that is opaque, translucent, clear-colored, or combinations thereof; and either the first color appearance or the second color appearance is clear-colorless; such that the transitional color appearance is comprised of the first color appearance or the second color appearance and at least a portion of the third color appearance.

Moreover, the cover may have a third color appearance that is opaque, translucent, clear-colored, or combinations thereof.

The invention also relates to a method of making a golf ball of the invention, comprising the steps of: providing a subassembly; providing a coating layer about the subassembly by: applying a first colorant having a first color appearance onto an outer surface of the subassembly at a first pole of the subassembly; applying a second colorant having a second color appearance that is different than the first color appearance onto the outer surface of the subassembly at an opposing pole thereof; such that: the first colorant creates a first color region of the coating layer on the outer surface of the subassembly that includes the first pole and has the first color appearance; and the second colorant creates a second color region of the coating layer on the outer surface of the subassembly that includes the opposing pole and has the second color appearance; and the first colorant and the second colorant collectively create a transition color region that is transitionally disposed between the first color region and the second color region and has a transitional color appearance that is comprised of the first color appearance and the second color appearance. The transition color region may extend circumferentially about the outer surface of the subassembly.

In one embodiment, a first colorant spray gun applies the first colorant onto the outer surface of the subassembly at the first pole and a second colorant spray gun applies the second colorant onto the outer surface of the subassembly at the opposing pole; and the transitional color appearance is created and/or adjusted within the transition color region by pre-selecting and/or coordinating at least one of i) relative volumes of first colorant and second colorant use; ii) an atomization pressure of each of the first colorant spray gun and the second colorant spray gun; ii) a spray gun pressure of each of the first colorant spray gun and the second colorant spray gun; and/or order that each of the first colorant spray gun and the second colorant spray gun spray colorant onto the outer surface of the subassembly.

In one particular embodiment, the first colorant and the second colorant are applied onto the outer surface of the subassembly at opposing poles of the subassembly simultaneously.

In another particular embodiment, the first colorant and the second colorant are applied onto the outer surface of the subassembly at opposing poles of the subassembly sequentially.

In one embodiment, the first colorant and the second colorant coat the outer surface of the subassembly within the transition color region such that at least one portion of the coating layer is comprised of the first colorant being overlaid with the second colorant and such that at least one different portion of the coating layer is comprised of the second colorant being overlaid with the first colorant.

In another embodiment, a surface coverage ratio of percent surface coverage of the first colorant within the first color region to percent surface coverage of the second colorant within the second color region is about 1:1; and surface coverage of the first colorant is greater than surface coverage of the second colorant adjacent the first color region; and surface coverage of the second colorant is greater than surface coverage of the first colorant adjacent the second color region.

In a specific such embodiment, the first colorant is overlaid with the second colorant within the transition color region adjacent the first color region; and the second colorant is overlaid with the first colorant within the color region adjacent the second color region.

As used herein, the term "surface coverage" refers to the volume/concentration/amount of colorant coating the subassembly at a given location on the surface of the subassembly (such as a cover surface).

In yet another embodiment, the first colorant and the second colorant coat a transition dimple surface of at least one transition dimple of the subassembly within the transition color region such that the first color appearance and the second color appearance are juxtaposed on the transition dimple surface.

Once again, the cover may have a third color appearance that is opaque, translucent, clear-colored, or combinations thereof.

BRIEF DESCRIPTION OF THE DRAWINGS

These and other aspects of the present invention as set forth in the appended claims may be more fully understood with reference to, but not limited by, the following detailed description in connection with the following accompanying drawings in which like numerals refer to like elements of the inventive golf ball:

DETAILED DESCRIPTION

Figure 1:
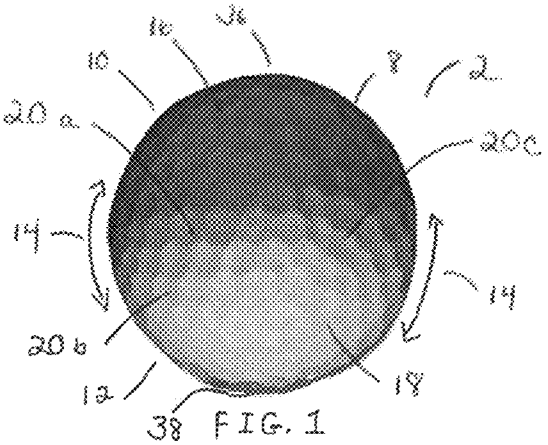
FIG. 1 is a perspective view of a golf ball of the invention according to one embodiment.

Advantageously, golf balls of the invention have an overall golf ball color appearance that is comprised of two differing color regions which transition into and from each other within a transition color region therebetween without any visually apparent boundary/border between color regions.

In one embodiment, a golf ball of the invention comprises a core, a cover and a coating layer disposed entirely about an outer surface of the cover; wherein the coating layer has a first color region having a first color appearance; a second color region having a second color appearance that is different than the first color appearance; and a transition color region that comprises the first color appearance and the second color appearance and is transitionally disposed between the first color region and the second color region.

The transition color region transitions from and into each of the first color region and the second color region and is not defined by a visually apparent boundary/border there between. Yet, desirably, in golf balls of the invention, the boundary/border between color regions may be detected and assessed/ascertained via color analysis using, for example, a spectrophotometer (discussed and detailed more fully herein further below such as in connection with example golf balls EX. 1-EX. 6 of TABLE I) and represented in terms of tristimulus colorimetry.

Thus, the first color region has a first color appearance that is spectrophotometer-measurable and the second color region has a second color appearance that is spectrophotometer-measurable. In turn, the transition color region therebetween has a transitional color appearance that is comprised of a plurality of blends of the first color appearance and the second color appearance—each likewise being spectrophotometer-measurable.

It is also possible for portions of the transitional color appearance within the transition color region to comprise instances of solely the first color appearance or solely the second color appearance, with the limitations being that the transitional color appearance never comprises solely the first color appearance adjacent the first color region, and never comprises solely the second color appearance adjacent the second color region.

Moreover, the cover may have a third color appearance that is opaque, translucent, clear-colored, or combinations thereof. As with the first color appearance and the second color appearance, the third color appearance of the cover is measurable via color analysis using, for example, a spectrophotometer and represented in terms of tristimulus colorimetry, and may even include white and black and any known color effects.

Furthermore, the coating layer may be applied onto the cover such that at least one dimple is partially located in the transition color region of the coating layer and partially located in one of the first color region or second color region. For example, a first portion of the dimple may be coated with a spectrophotometer-measured first color appearance and be located in the first color region while an adjacent transition portion of the dimple is coated with a spectrophotometer-measured transitional color appearance (e.g., a blend of the first color appearance and the second color appearance or solely the second color appearance.

Conversely, a first portion of the dimple may be coated with a spectrophotometer-measured second color appearance and be located in the second color region while an adjacent transition portion of the dimple is coated with a spectrophotometer-measured transitional color appearance (e.g., a blend of the first color appearance and the second color appearance or solely the first color appearance.

In one embodiment, the transitional color appearance can be developed such that the degree of coverage of the first color appearance on the outer surface of the subassembly/cover reduces progressing from adjacent the first color region toward the second color region. The blends will therefore be comprised more primarily of the first color appearance than of the second color appearance closer to the first color region.

In turn, the degree of coverage of the second color appearance on the outer surface of the subassembly/cover can be reduced progressing from adjacent the second color region toward the first color region. The blends will therefore be comprised more primarily of the second color appearance than of the first color appearance closer to the second color region.

By "degree of coverage", it is meant the surface area over which a given amount of paint or other colorant will spread and hide the surface (e.g., cover) that it is coating.

Therefore, in one particular embodiment, a blue colorant may be sprayed onto or otherwise applied at a first pole of the cover (or other subassembly) and a pink colorant may be sprayed onto or otherwise applied at an opposing pole of the cover (or other subassembly) such that the first color region has the color appearance of the blue colorant, the second color region has the color appearance of pink colorant, and the transitional color region has a transitional color appearance that is comprised of a plurality of blends of the blue colorant and the pink colorant. The transitional color appearance of the transitional color region may be comprised of blends of the blue colorant and the pink colorant which transition from being more predominantly blue, closer to the first color region, to being more predominantly pink, closer to the second color region.

The first color appearance and second color appearance may differ by color (hue) or have the same hue but differ in some other color measure regard such as by Chroma, lightness, etc. The coating layer applied/provided onto a subassembly may be transparent and/or translucent and/or opaque. Meanwhile, the coating layer applied/provided onto the subassembly may be either glossy, metallic or have a matte finish.

And any known color effects may be added to or included in the coating materials applied/provided onto a golf ball of the invention as desired to create a golf ball of the invention. Additionally, the coating layer applied/provided on the subassembly may be solvent-borne, water-borne and/or powdered.

The subassembly/substrate being coated, such as a covered or coated golf ball, can itself have a single color or be multi-colored such as having two differently colored hemispheres. The substrate being coated can itself be at least opaque, clear-colored, translucent (so as to be at least partially transparent) and may in some embodiments further contribute to and participate in the overall golf ball transitional color appearance, especially if the coating layer is clear-colored, translucent or otherwise at least partially transparent.

For example, in one specific embodiment, the cover may have a third color appearance that is opaque, translucent, clear-colored, or combinations thereof; while the first color appearance and/or the second color appearance is clear-colored, translucent or at least partially transparent; such that the transitional color appearance is comprised of each of the first color appearance, the second color appearance, and at least a portion of the third color appearance. In this embodiment, at least a portion of the third color appearance of the cover (or other subassembly) and each of the first color appearance and the second color appearance collectively participate in creating the transitional color appearance within the transition color region without any visually apparent boundary/border between color regions. In one such embodiment, the transition color region is transitionally disposed about an equator of the golf ball symmetrically.

In a different embodiment, the transition color region is transitionally disposed about an equator of the golf ball asymmetrically. In one such embodiment, the cover has a third color appearance that is opaque, translucent, clear-colored, or combinations thereof; and one of the first color appearance or the second color appearance is clear-colorless; such that the transitional color appearance is comprised of at least a portion of third color appearance and of either the first color appearance or the second color appearance. In this embodiment, at least a portion of the third color appearance of the cover/subassembly and either the first color appearance or the second color appearance (whichever is not clear-colorless) collectively participate in creating the transitional color appearance within the transition color region without any visually apparent boundary/border between color regions.

This transitional color appearance can be developed such that the colorant of whichever of the first color appearance or the second color appearance is not clear-colorless has a degree of coverage on the outer surface of the subassembly/cover that reduces progressing from the pole at which the non-clear-colorless colorant is applied onto the outer surface toward the opposing color region. Meanwhile, the degree of coverage of clear-colorless "colorant" also reduces on the surface of the subassembly progressing from the pole of the golf ball where the clear-colorless colorant is sprayed onto the outer surface of the subassembly toward the opposing color region. Thus, within the transitional color region, there will be instances wherein the clear-colorless colorant (first color appearance or second color appearance) is overlaid with the non-clear colorless colorant; and vice versa, wherein the non-clear colorless colorant is overlaid with the clear-colorless colorant.

While the embodiments above describe the coating layer being formed about a cover, it is to be understood that the coating layer having a transitional color appearance may be formed or otherwise applied about any golf ball subassembly. For example, it is envisioned that a colored coating may be disposed between the cover and the coating layer and contribute to and participate in creating the transitional color appearance of the golf ball's transition color region. The colored coating may be opaque, translucent or clear-colored, and therefore in some instances a color appearance of the underlying cover itself can contribute to the transitional color appearance through such a coating.

Figure 2:
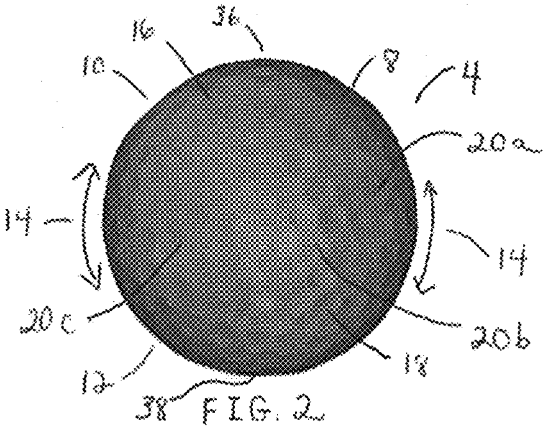
FIG. 2 is a perspective view of a golf ball of the invention according to another embodiment.
Figure 3:
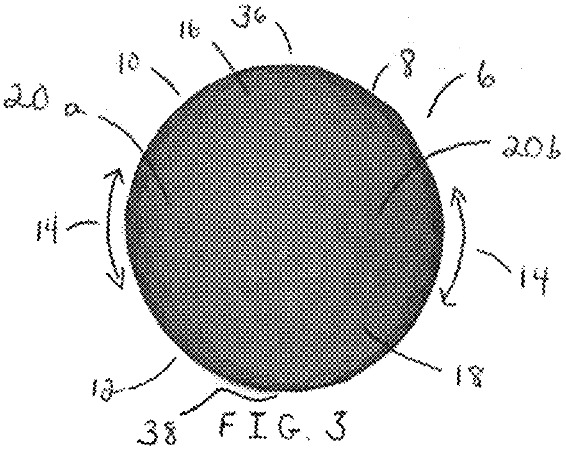
FIG. 3 is a perspective view of a golf ball of the invention according to yet another embodiment.

A golf ball of the invention may be even more fully understood with reference to, but not limited by, the three inventive golf balls depicted in FIG. 1, FIG. 2 and FIG. 3 as follows. In each of golf ball 2 of FIG. 1, golf ball 4 of FIG. 2, and golf ball 6 of FIG. 3, coating layer 8 comprises first color region 10, second color region 12, and transitional color region 14 that is transitionally disposed between first color region 10 and second color region 12. First color region 10 has a first color appearance 16, and second color region 12 has a second color appearance 18 that is different than first color appearance 16.

Meanwhile, transitional color region 14 has a transitional color appearance which includes but is not limited to: i) 20*a* which is produced from first color appearance 16 partially overlapping second color appearance 18 within transitional color region 14; and/or ii) 20*b* which is produced from second color appearance 18 partially overlapping first color appearance 16 within transitional color region 14; and/or iii) 20*c* (see golf balls 2 and 4 of FIG. 1 and FIG. 2, respectively) wherein first color appearance 16 is located on a dimple 19 of the golf ball closer to pole 38 than is second color appearance 18 on that same dimple 19.

Figure 6:
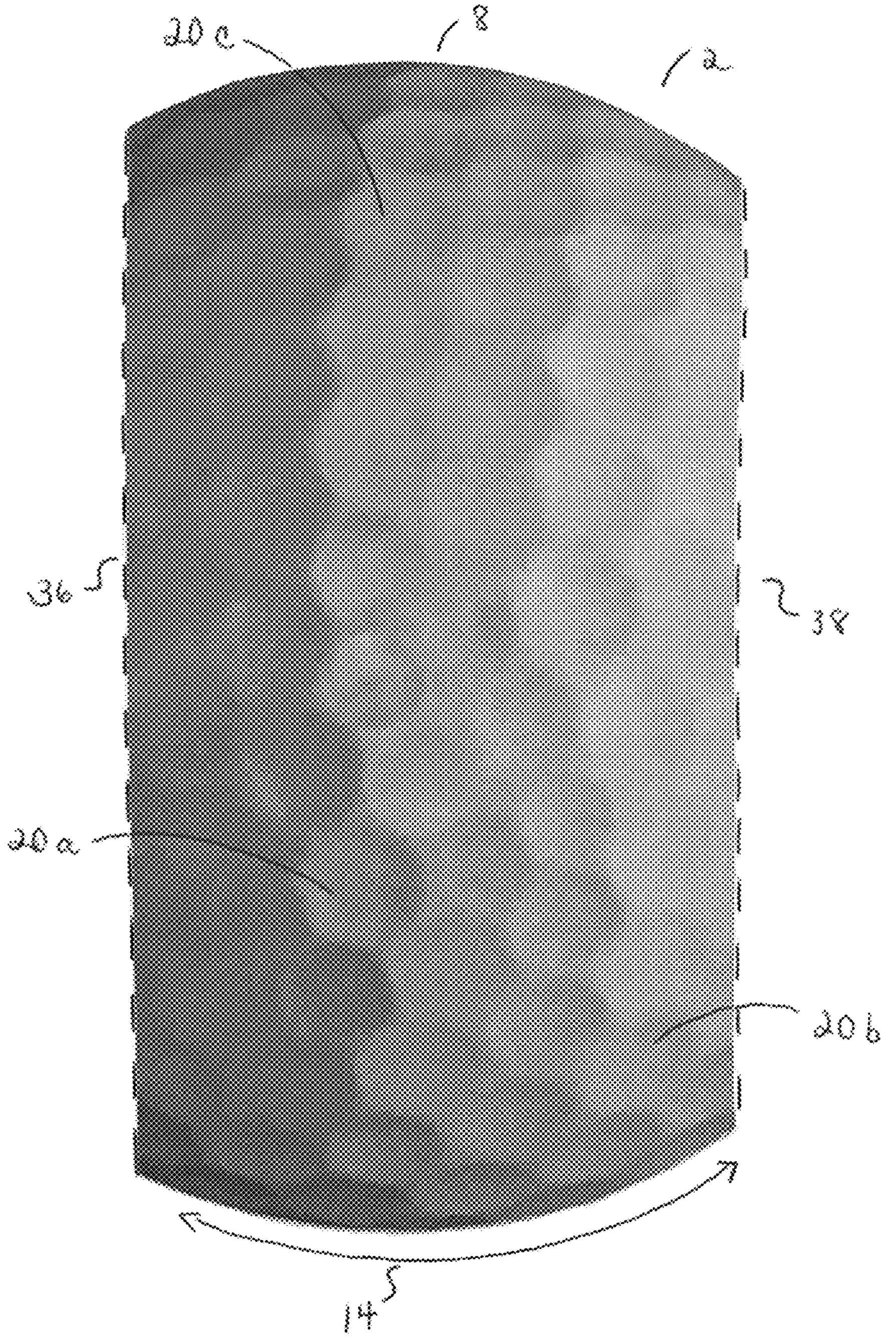
FIG. 6 is a partial view of the golf ball of the invention depicted in FIG. 1.

Of course, it is also envisioned that alternatively, embodiment, 20*c* may be produced where second color appearance 18 is located on dimple 19 of the golf ball closer to pole 36 than is first color appearance 16 on that same dimple 19. Meanwhile, FIG. 6 is an enlarged partial view of golf ball 2 of FIG. 1 that highlights the numerous possible differing color appearances forming a transitional color appearance within transition color region 14 such as but not limited to 20*a*, 20*b*, and/or 20*c*.

In a specific embodiment, at least one transition dimple of the cover is located within the transition color region and has a transition dimple surface that is coated with the first color appearance and the second color appearance such that the first color appearance and the second color appearance are juxtaposed on an outer surface of the transition dimple.

In a particular such embodiment, the transition dimple has a first side and a second side; wherein a first pole of the first color region is closer to the first side than the second side; and wherein a second pole of the second color region is closer to the second side than the first side; and wherein the first color appearance is located on the second side and the second color appearance is located on the first side.

Figure 4:
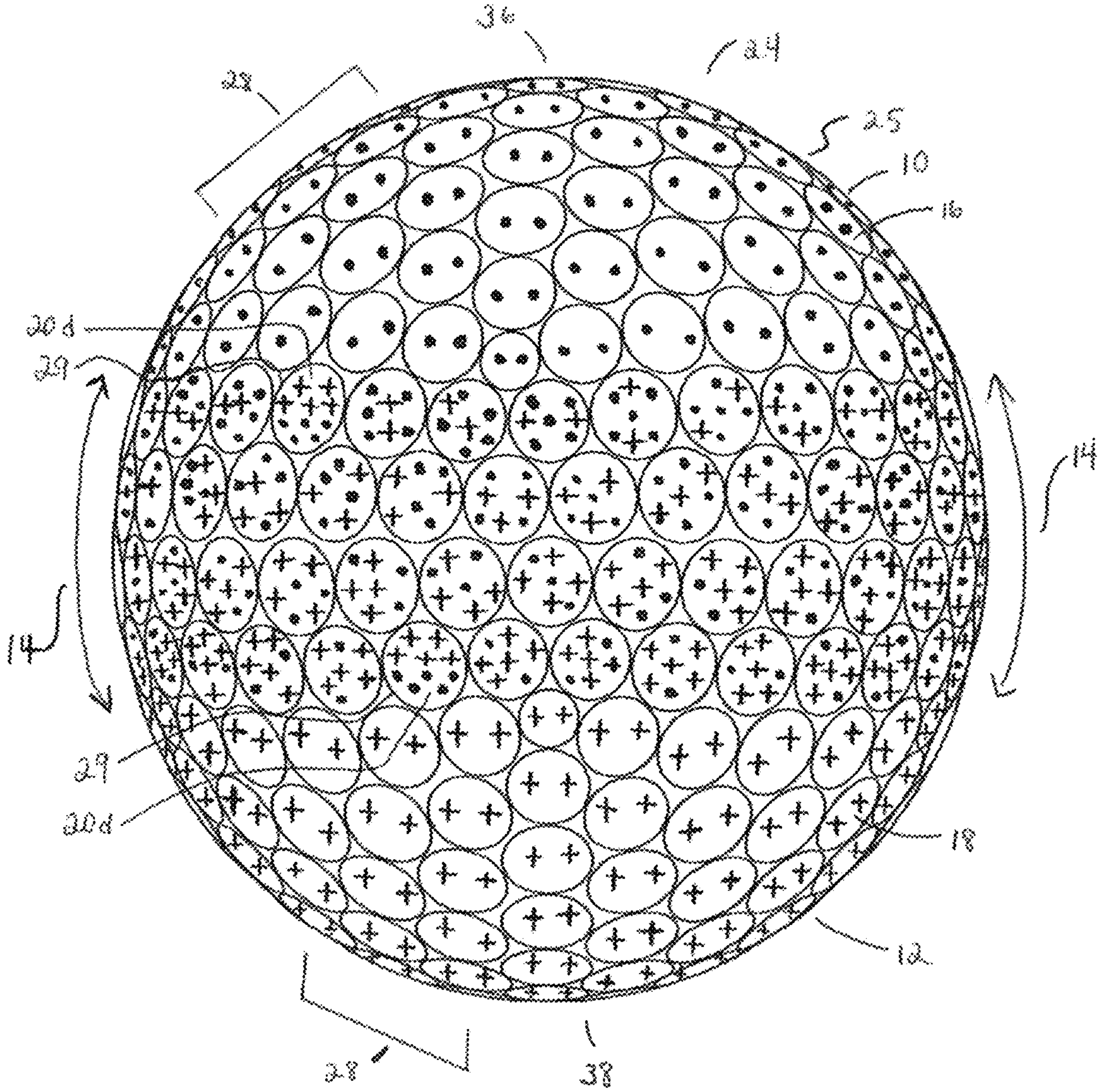
FIG. 4 is a perspective view of a golf ball of the invention according to a specific embodiment.

The invention may also be more fully understood with reference to, but not limited by, inventive golf ball 24 depicted in FIG. 4 which evidences numerous possible transitional color appearances which may be created within transition color region 14 of coating layer 25 of golf ball 24.

In FIG. 4, coating layer 25 of golf ball 24 has a first color region 10 having a first color appearance 16 therein denoted by "·" and a second color region 12 having a second color appearance 18 therein denoted by "+". It is envisioned that "·" and "+" can each be produced on golf ball 24 using any known differing coloring agents/compositions.

Meanwhile, coating layer 25 of golf ball 24 of FIG. 4 has a transition color region 14 that includes numerous different ways that first color appearance "·" and second color appearance "+" can be appear together transitionally within transition color region 14 and between first color region 10 and second color region 12.

Figure 5:
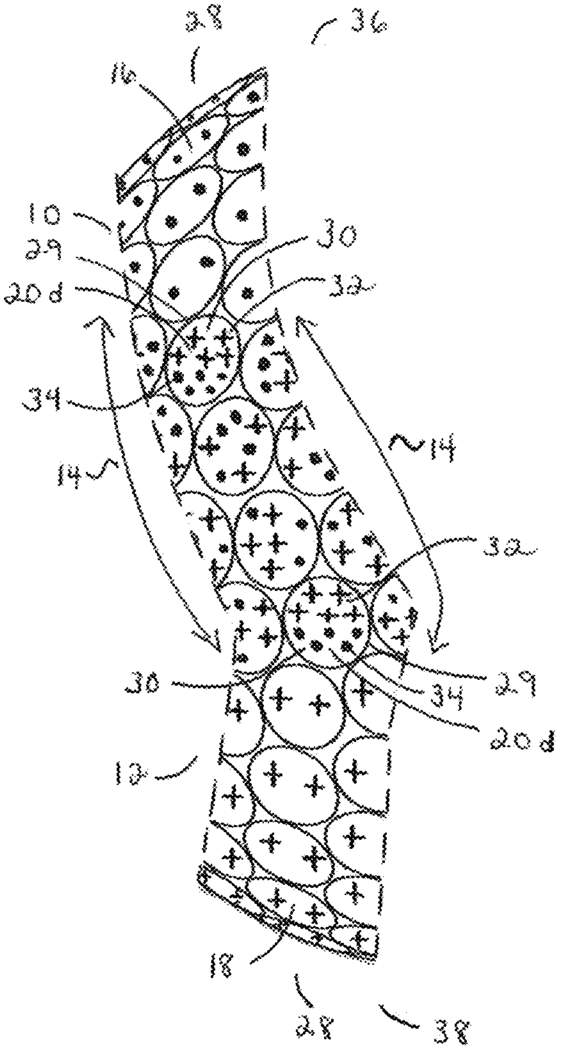
FIG. 5 is a partial view of the golf ball of the invention depicted in FIG. 4.

In turn, FIG. 5 is a partial view 28 of golf ball 24 of FIG. 4. The location of partial view 28 on golf ball 24 of FIG. 4 is indicated on FIG. 4 by bracketing so that FIG. 4 and FIG. 5 may be considered together. Partial view 28 of FIG. 5 highlights a specific embodiment wherein transition color region 14 of coating layer 25 of golf ball 24 of FIG. 4 has a particular dimple transitional color appearance 20*d*.

Specifically, at least one transition dimple 29 of golf ball 24 is located within transition color region 14 and has a transition dimple surface 30 that is coated with first color appearance 16 "·" and second color appearance 18 "+" such that first color appearance 16 "·" and second color appearance 18 "+" are juxtaposed on transition dimple surface 30 of transition dimple 29. Moreover, transition dimple 29 has a first side 32 and a second side 34; wherein a first pole 36 of first color region 10 is closer to first side 32 than the second side 34; and wherein a second (opposing) pole 38 of second color region 12 is closer to second side 34 than to first side 32; and wherein first color appearance 16 ".", on transition dimple surface 30, is located on second side 34, while second color appearance 18 "+", on transition dimple surface 30, is located on the first side 32.

In golf balls of the invention, a color assessment within each of first color region 10, second color region 12 and transition color region 14 may be made, for example, in terms of tristimulus colorimetry. In this regard, the following CIELAB coordinates may be measured: lightness (L*), chroma (C*), hue angle from 0° to 360° (h°), (a*) value (represents the degree of redness (positive a*) and greenness (negative a*) and (b*) value (represents the degree of yellowness (positive b*) and blueness (negative b*).

Such measurements may be taken in each of the first color region, second color region and transition color region of a golf ball of the invention using, for example, a Gretag Macbeth CE 7000A spectrophotometer under illuminant D65, with a 10° standard observer.

Accordingly, in a specific embodiment, the first color region may have a first color appearance with first pre-selected CIELAB coordinates $L_1$*, $a_1$*, $b_1$*, $C_1$*, $h_1$° resulting from a first colorant being applied onto the outer surface of a subassembly (such as a cover) at a first pole thereof. In turn, the second color region may have a second color appearance with second pre-selected CIELAB coordinates $L_2$*, $a_2$*, $b_2$*, $C_2$*, $h_2$° resulting from a second colorant being applied onto the outer surface of the subassembly at a second pole thereof.

Meanwhile, the transition color region may have a transitional color appearance that is comprised of either/each of i) a plurality of measurable CIELAB coordinates $L_{Bn}$*, $a_{Bn}$*, $b_{Bn}$*, $C_{Bn}$*, $h_{Bn}$°, wherein "n" represents the number of differing color appearances within the transition color region; or/and ii) a juxtaposition of first pre-selected CIELAB coordinates $L_1$*, $a_1$*, $b_1$*, $C_1$*, $h_1$° and second pre-selected CIELAB coordinates $L_2$*, $a_2$*, $b_2$*, $C_2$*, $h_2$°. In this regard, as stated above, while it is possible for portions of the transitional color appearance within the transition color region to comprise instances of solely the first color appearance or solely the second color appearance, the transitional color appearance never comprises solely the first color appearance adjacent the first color region, and also never comprises solely the second color appearance adjacent the second color region.

Referring to "i)" immediately above, the plurality of measurable CIELAB coordinates $L_{Bn}$*, $a_{Bn}$*, $b_{Bn}$*, $C_{Bn}$*, $h_{Bn}$° may result from blends of the first colorant transitionally overlapping the second colorant as well as the second colorant transitionally overlapping the first colorant on the outer surface of the cover (or other subassembly) when the first colorant and the second colorant are applied onto the outer surface of the subassembly at the first pole and the second pole thereof. There will be instances wherein the first colorant is overlaid with the second colorant, and other instances wherein the second colorant is overlaid with the first colorant.

And the transitional color appearance can be developed such that the degree of coverage of the first colorant (first degree of coverage) on the outer surface of the subassembly/cover progressively reduces from adjacent the first color region toward the second color region (i.e., in a first direction from adjacent the first pole toward the opposing pole). The blends will therefore be comprised more primarily of the first colorant than of the second colorant closer to the first color region. In turn, the degree of coverage of the second colorant (second degree of coverage) on the outer surface of the subassembly/cover can be progressively reduced from adjacent the second color region toward the first color region (i.e., in a second direction from adjacent the opposing pole toward the first pole). In this case, the blends will be comprised more primarily of the second colorant than of the first colorant closer to the second color region.

Juxtaposition occurs when at least one transition dimple has a transition dimple surface that is coated with the first color appearance with first pre-selected CIELAB coordinates $L_1$*, $a_1$*, $b_1$*, $C_1$*, $h_1$° and the second color appearance with the second pre-selected CIELAB coordinates $L_2$*, $a_2$*, $b_2$*, $C_2$*, $h_2$° such that the first color appearance and second color appearance are juxtaposed on the transition dimple surface of the transition dimple. In the transition color region, the transition dimple has a first side and a second side; wherein a first pole of the first color region is closer to the first side than the second side; and wherein a second pole of the second color region is closer to the second side than the first side; and wherein the first color appearance with first pre-selected CIELAB coordinates $L_1$*, $a_1$*, $b_1$*, $C_1$*, $h_1$° on the dimple surface of the transition dimple is located on the second side and the second color appearance with the second pre-selected CIELAB coordinates $L_2$*, $a_2$*, $b_2$*, $C_2$*, $h_2$° on the on the dimple surface of the transition dimple is located on the first side.

In the case of juxtaposition of first pre-selected CIELAB coordinates $L_1$*, $a_1$*, $b_1$*, $C_1$*, $h_1$° and second pre-selected CIELAB coordinates $L_2$*, $a_2$*, $b_2$*, $C_2$*, $h_2$°, the entire dimple is located within the transition color region only if a different spectrophotometer-measurable color appearance is detected than that of the adjacent first or second color region.

Thus, adjacent the first color region, the transition color region spectrophotometer-measurably begins if: i) a blend of first pre-selected CIELAB coordinates $L_1$*, $a_1$*, $b_1$*, $C_1$*, and second pre-selected CIELAB coordinates $L_2$*, $a_2$*, $b_2$*, $C_2$*, $h_2$° is spectrophotometer-measurably detected; and/or ii) second pre-selected CIELAB coordinates $L_2$*, $a_2$*, $b_2$*, $C_2$*, $h_2$° is spectrophotometer-measurably detected (due to juxtaposition). Herein, the term spectrophotometer-measurably detected means that a spectrophotometer or other suitable color analysis device inspects the coating layer at a given location on the golf ball and ascertains color coordinates therefor.

Where color analysis reveals a blend, the CIELAB coordinates $L_{Bn}$*, $a_{Bn}$*, $b_{Bn}$*, $C_{Bn}$*, $h_{Bn}$° do not match either of first pre-selected CIELAB coordinates $L_1$*, $a_1$*, $b_1$*, $C_1$*, $h_1$° of the first color appearance nor second pre-selected CIELAB coordinates $L_2$*, $a_2$*, $b_2$*, $C_2$*, $h_2$° of the second color appearance. Therefore, there are numerous possible blend CIELAB coordinates $L_{Bn}$*, $a_{Bn}$*, $b_{Bn}$*, $C_{Bn}$*, $h_{Bn}$° that can result from the first color appearance being overlaid with the second color appearance (and/or vice versa) within the transition color region of a coating layer formed about the outer surface of a subassembly such as a cover.

For example, in one specific embodiment, a first colorant, having a first color appearance, may be applied onto the cover surface at a first pole of a golf ball, while a second (different) colorant having a second (differing) color appearance is applied onto the cover surface at a second opposing pole of the golf ball. The first colorant coats and creates a first color region on the cover surface, the second colorant coats and creates a second color region on the cover surface, and the first colorant and second colorant collectively overlay and/or overlap and/or intersect, or otherwise superimpose and/or combine with each other in many differing ways to create a transition color appearance that is comprised of a plurality of CIELAB coordinates $L_{Bn}$*, $a_{Bn}$*, $b_{Bn}$*, $C_{Bn}$*, $h_{Bn}$° resulting from the first colorant and second colorant being provided onto the golf ball outer surface at opposing poles of the golf ball.

Accordingly, a golf ball of the invention is produced/created having an overall transitional golf ball color appearance, incorporating a coating layer having no visually apparent distinct borders/boundaries between color regions. Instead, desirably, the color appearances of each color region may be assessed/ascertained/measured/determined via color analysis using, for example, a spectrophotometer such as referenced above and which may be represented in terms of tristimulus colorimetry. Golf balls of the invention may be better understood by referring to TABLE I below in which color measurements are provided for a first color region, a second color region, and a transitional color region of each of six inventive golf balls Ex. 1, Ex. 2, Ex. 3, Ex. 4, Ex. 5, and Ex. 6 as follows:

TABLE I

| Color Region Measured | CIELAB Parameter Measured | Blue into Pink EX. 1 | Blue into Pink EX. 2 | Orange into Pink EX. 3 | Orange into Pink EX. 4 | Blue into Yellow EX. 5 | Blue into Yellow EX. 6 |
|---|---|---|---|---|---|---|---|
| First | L* | 64.07 | 65.10 | 68.99 | 68.70 | 67.50 | 67.38 |
| Color | a* | −13.27 | −16.66 | 37.04 | 37.47 | −24.64 | −25.33 |
| Region | b* | −24.99 | −24.76 | 43.87 | 43.94 | −20.41 | −19.01 |
| Measurements | C | 28.29 | 29.84 | 57.41 | 57.95 | 32.00 | 31.67 |
| | h° | 242.03 | 236.07 | 49.82 | 49.54 | 219.64 | 216.89 |
| Transition | L* | 60.06 | 60.73 | 64.05 | 63.31 | 70.74 | 72.66 |
| Color | a* | 14.77 | 7.49 | 44.17 | 45.00 | −28.72 | −27.50 |
| Region | b* | −19.61 | −20.72 | 19.84 | 16.17 | 4.36 | 17.68 |
| 1st location | C | 24.55 | 22.07 | 48.42 | 47.82 | 29.05 | 32.70 |
| Measurements | ho | 306.98 | 290.13 | 24.19 | 19.77 | 171.37 | 147.26 |
| Transition | L* | 60.96 | 59.30 | 64.40 | 63.18 | 73.83 | 73.01 |
| Color | a* | 7.22 | 19.59 | 43.08 | 44.32 | 28.48 | −27.38 |
| Region | b* | −21.91 | −17.45 | 21.38 | 16.50 | 20.23 | 18.86 |
| 2nd location | C | 23.07 | 26.23 | 48.09 | 47.30 | 34.93 | 33.24 |
| Measurements | h° | 288.25 | 318.30 | 26.39 | 20.42 | 144.61 | 145.45 |
| Transition | L* | 60.41 | 60.34 | 63.49 | 63.01 | 75.22 | 72.61 |
| Color | a* | 10.19 | 11.22 | 45.15 | 44.85 | 26.27 | −28.02 |
| Region | b* | −20-37 | −19.94 | 16.09 | 15.56 | 30.08 | 15.16 |
| 3rd location | C | 22.78 | 22.88 | 47.93 | 47.47 | 39.94 | 31.86 |
| Measurements | h° | 296.57 | 299.37 | 19.61 | 19.14 | 131.13 | 151.58 |
| Second | L* | 59.10 | 59.08 | 59.43 | 59.58 | 84.48 | 84.36 |
| Color | a* | 47.44 | 47.44 | 48.80 | 48.65 | −18.28 | −18.22 |
| Region | b* | −9.41 | −8.84 | −5.52 | −3.27 | 66.55 | 67.10 |
| Measurements | C | 48.36 | 48.26 | 49.11 | 48.76 | 69.02 | 69.53 |
| | h° | 348.78 | 349.45 | 353.54 | 356.16 | 105.36 | 105.19 |

Referring to TABLE I, inventive golf balls Ex. 1, Ex. 2, Ex. 3, Ex. 4, Ex. 5, and Ex. 6 were created by identically placing each of six golf identical golf balls between a first colorant spray gun and a second colorant spray gun. In this experiment, the first colorant spray gun and second colorant spray gun were placed at opposing poles of each given golf ball. Additionally, colorant spray gun pressure and atomization pressure and nozzle-to-golf ball distance was preset identically for each pair of first and second colorant spray guns.

Figure 7A:
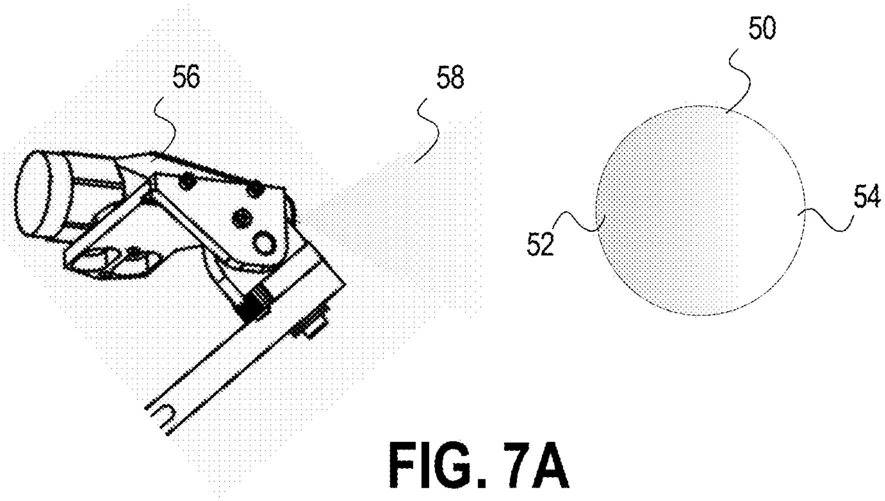
FIG. 7A is a diagram of a first colorant spray gun and golf ball.
Figure 7B:
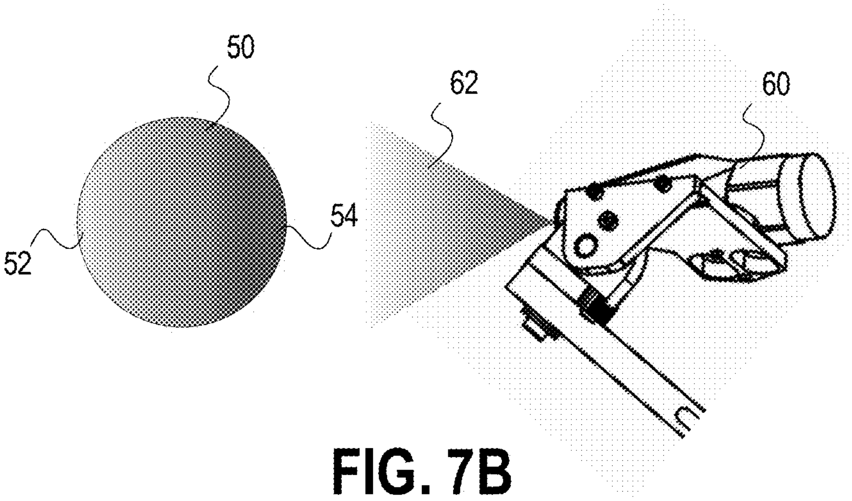
FIG. 7B is a diagram of a second colorant spray gun and golf ball.

FIGS. 7A and 7B are exemplary diagrams including a golf ball 50 having a first pole 52 and an opposing second pole 54. FIG. 7A includes a first colorant spray gun 56 configured to spray a first colorant 58 at the first pole 52 of the golf ball 50 and FIG. 7B includes a second colorant spray gun 60 configured to spray a second colorant 62 at the second pole 54 of the golf ball 50.

The covers of golf balls Ex. 1 and Ex. 2 were spray painted at opposing poles using Spectracron™ blue primer (available from PPG Industries Inc.) in the first colorant spray gun and using a Spectracron™ pink primer in the second colorant spray gun.

Meanwhile, the covers of each of golf balls Ex. 3 and Ex. 4 were painted at opposing poles using orange Spectracron™ primer in the first colorant spray gun and pink Spectracron™ primer in the second colorant spray gun.

In turn, the covers of each of golf balls Ex. 5 and Ex. 6 were painted at opposing poles using the blue Spectracron™ primer in the first colorant spray gun and yellow Spectracron™ primer in the second colorant spray gun.

Resulting inventive golf balls Ex. 1, Ex. 2, Ex. 3, Ex. 4, Ex. Ex. 5, and Ex. 6 of TABLE I each thereby had a coating layer formed entirely about its corresponding cover comprised of a first color region, a second color region, and a transitional color region that was transitionally disposed between the first color region and the second color region and extended about the entire circumference of its respective cover. Color appearance measurements were ascertained in each first color region, second color region and transitional color region of inventive golf balls Ex. 1, Ex. 2, Ex. 3, Ex. 4, Ex. 5, and Ex. 6 by placing each in a Gretag Macbeth CE 7000A spectrophotometer under illuminant D65, with a 10° standard observer. For each golf ball, a single color measurement was taken for each of the first color appearance of the first color region and the second color appearance of second color region; and three color measurements were taken for the transitional color appearance within the transition color region. All of these measurements are recorded in TABLE I.

It should be noted that while inventive golf balls Ex. 1, Ex. 2, Ex. 3, Ex. 4, Ex. 5, and Ex. 6 of TABLE I were created using two colorant spray guns (e.g., a first colorant spray gun and a second colorant spray gun), embodiments are also envisioned wherein greater than two colorant spray guns may be used and/or wherein the colorant spray guns may be positioned less than opposingly, as long as doing so creates a transitional color region between two or more color regions such as a first color region and a second color region.

Additionally, it should be noted that the specific settings (e.g., first colorant spray gun settings and second colorant spray gun settings) selected for each of colorant spray gun pressure, atomization pressure and nozzle-to-golf ball distance may vary depending, for example, on the dispense time as well as on the coverage desired on the golf ball for each of the first colorant and the second colorant and also depending the viscosity of the colorant being used.

In non-limiting examples, colorant spray gun pressure may be about 50-70 psi, atomization pressure may be about 25-50 psi, and nozzle-to-golf ball distance may be about 2.5 to 3.5 inches.

And while example golf balls of the invention Ex. 1, Ex. 2, Ex. 3, Ex. 4, Ex. 5, and Ex. 6 of TABLE I were created using liquid primers, it is envisioned that any suitable known coloring agents/colorants such as but not limited to pigments, dyes, tints, inks, structured colorants, etc. may be used.

Furthermore, embodiments are envisioned wherein methods other than using colorant spray guns are used for creating a golf ball of the invention, such as wherein the first color appearance, the second color appearance, and the transition color appearance are created by spraying, splattering, sputtering, wiping, and/or brushing a first colorant onto the outer surface of the cover at a first pole; and spraying, splattering, sputtering, wiping, and/or brushing a second colorant onto the outer surface of the cover at an opposing pole of the cover.

Embodiments are envisioned wherein a color detection device may be used to measure the surface areas of each color region. For example, the color detection device may be used to detect where on the coating layer the first color appearance of the first color region ends and the transition color appearance of the transition color region begins. In some such embodiments, the transition color region may have a surface area $SA_{TCR}$ and the coating layer may have a total surface area $SA_{CL}$ such that a ratio of $SA_{TCR}:SA_{CL}$ is at least 0.10. In another such embodiment, the transition color region may have a surface area $SA_{TCR}$ and the coating layer may have a total surface area $SA_{CL}$ such that a ratio of $SA_{TCR}$ to $SA_{CL}$ is:

$$0.10<SA_{TCR}:SA_{CL}\leq 0.50.$$

In a different such embodiment, the first color region may have a surface area $SA_{FCR}$ and the second color region may have a surface area $SA_{TCR}$ and the coating layer may have a total surface area $SA_{CL}$ such that each of a ratio of $SA_{FCR}$ to $SA_{CL}$ and a ratio of $SA_{TCR}:SA_{CL}$ is at least 0.30.

In one embodiment, $SA_{FCR}$ is the same as $SA_{TCR}$. In another embodiment, $SA_{FCR}$ is greater than $SA_{TCR}$. In yet another embodiment, $SA_{FCR}$ is less than $SA_{TCR}$ of the second color region.

Embodiments are also envisioned wherein algorithmic coating applications may be implemented in making golf balls of the invention so that each resulting golf ball has a different custom overall transitional color appearance. Toward this end, lines of code can be written so that software pulls from a database one of the numerous possible ways that the first color appearance and the second color appearance can form on the surface of the subassembly within the transition color region and collectively produce a transitional color appearance on the outer surface of a subassembly within the transition color region.

Finished golf balls of the invention may have any number of layers, with the one limitation being that at least one coating layer is disposed entirely about an outer surface of a subassembly (such as a core and a cover) wherein the coating layer has a first color region having a first color appearance; a second color region having a second color appearance that is different than the first color appearance; and a transition color region that is transitionally disposed between each of the first color region and the second color region and comprises the first color appearance and the second color appearance. In many embodiments, the transitional color region is not only transitionally disposed between the first color region and the second color region but is meanwhile also disposed circumferentially about the outer surface of the subassembly.

The coating layer may comprise any colorant that may be applied or otherwise provided about the outer surface of the cover or other subassembly being coated to create the first color region, having a first color appearance; the second color region, having a second color appearance that is different than the first color appearance; and the transition color region that is transitionally disposed between each of the first color region and the second color region and comprises the first color appearance and the second color appearance as described and claimed herein.

The coating layer may have any known thickness that can be so applied or otherwise provided. For example, each coating layer may have a thickness of from about 0.1 μm to about μm, or from about 0.1 μm to about 25 μm, or from about 0.1 μm to about 14 μm, or from about 2 μm to about 9 μm, for example. Or, one or more such inventive coating layers may be formed about the outer surface of a cover or other subassembly and have a combined thickness of from about 0.1 μm to about 100 μm, or from about 2 μm to about 50 μm, or from about 2 μm to about μm.

It is also envisioned that one or more additional coating layers (clear, clear-colored, and/or translucent) may be applied about an outer surface of the coating layer of a golf ball of the invention.

In golf balls of the invention, the surface/substrate/layer onto and about which the coating layer is formed may comprise any known golf ball material such as but not limited to ionomers, HNPs, polyurethanes (thermoset, thermoplastic), polyureas, polyurethane/polyurea hybrids, polybutadienes, plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

Otherwise, a novel golf ball produced by a method of the invention may include a core and a cover, although embodiments are indeed envisioned wherein the coating layer serves as a different layer such as an intermediate of inner cover layer.

That being said, a core in a golf ball of the invention may be a single core or be multi-layered. For example, a multi-layer core may comprise an inner core (sometimes also referred to as a center or spherical inner core) and an outer core layer.

Additionally, one or more intermediate core layers may be disposed between the core and the outer core layer. Intermediate layers generally comprise a casing layers, moisture barrier layers, film layers, coating layers, and/or inner cover layers. Outer core layers are even sometimes referred to as intermediate layers.

The core often comprises rubber, although embodiments are indeed envisioned wherein any material known in the golf ball art may be used in the core to target desired golf ball properties and playing characteristics. Thus, materials typically used as an intermediate layer or an outermost cover layer may sometimes be used as a core material.

Non-limiting examples of suitable rubber materials include polybutadiene, ethylene-propylene rubber, ethylene-propylene-diene rubber, polyisoprene, styrene-butadiene rubber, polyalkenamers, butyl rubber, halobutyl rubber, and/or polystyrene elastomers. In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures.

In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures.

A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Michigan; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 IVIES, CB 60, CB Nd 60, CB 55 NF, CB 70 B, CB KA 8967, and CB 1221, available from Lanxess Corp. of Pittsburgh. Pennsylvania; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions used in connection with the methods and golf balls of this invention may be peroxide-cured without inhibiting cure. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

Suitable co-agents, where desired, may include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates.

In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent.

Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, in one embodiment, the elastomer composition may comprise i) about 50% to about 95% by weight of a non-metallocene catalyzed polybutadiene rubber; and ii) about 5 to about 50% by weight of a metallocene-catalyzed polybutadiene rubber; wherein examples of suitable non-metallocene catalysts (may be referred to as Ziegler-Natta catalysts) include neodymium, nickel, cobalt, titanium, aluminum, boron, and alkylithium-based catalysts, and combinations thereof; and examples of suitable metallocene catalysts are complexes based on metals such as cobalt, gadolinium, iron, lanthanum, neodymium, nickel, praseodymium, samarium, titanium, vanadium, zirconium; and combinations thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing.

A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one embodiment, the core may be formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

Meanwhile, materials often used in the intermediate layer include, for example, an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α, β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Additional suitable materials for golf ball layers include but are not limited to ionomers (e.g. Surlyn®, HNPs, etc.) and blends thereof. The ionomer may include, for example, partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

Ionomers, are typically ethylene/acrylic acid copolymers or ethylene/acrylic acid/acrylate terpolymers in which some or all of the acid groups are neutralized with metal cations such as na, li, mg, and/or zn. Non-limiting examples of commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN(® 8140 (Na) and SURLYN® 8546 (Li), which have an methacrylic acid content of about 19 percent. The acid groups of these high acid ionomer resins that have been neutralized to a certain degree with the designated cation.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form an ionomer according to the present invention. In addition, the ionomer may be a low acid or high acid ionomer. As detailed above, a high acid ionomer may be a copolymer of an olefin, e.g., ethylene, and at least 16 weight percent of an α,β-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the α,β-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

The ionomers may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can includes about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or ammonium-based components, or mixtures thereof, as disclosed in co-pending U.S. patent application Ser. No. 10/875,725, filed Jun. 25, 2004, entitled "Golf Ball Compositions Neutralized with Ammonium-Based and Amine-Based Compounds," which is incorporated in its entirety by reference herein.

Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

In a particular embodiment, ionomers may be selected from Dupont® HPF ESX 367, HPF 1000, HPF 2000, HPF AD1035, HPF AD Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD 1040 | 0.855 | 135 | 60 |
| HPF AD1172 | 0.800 | 32 | 37 |

Additional materials generally used to form intermediate layers include but are not limited to the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

Intermediate layer(s) may also be formed, at least in part, from primarily or fully non-ionomeric thermoplastic materials, polyurethanes, polyureas, polyurethane/polyurea hybrids, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters. And as with the core, embodiments are envisioned wherein at least one intermediate layer is formed from a material commonly used in a core and/or cover layer.

Polyurethanes are often used as cover materials. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled.

Thermoplastic polyurethanes are therefore particularly desirable as an outer cover layer material. Non-limiting examples of suitable thermoplastic polyurethanes include TPUs sold under the tradenames of Texin® 250, Texin® 255, Texin® 260, Texin® 270, Texin®950U, Texin® 970U, Texin® 1049, Texin® 990DP7-1191, Texin® DP7-1202, Texin®990R, Texin®993, Texin® DP7-1049, Texin® 3203, Texin® 4203, Texin® 4206, Texin® 4210, Texin® 4215, and Texin® 3215, each commercially available from Covestro LLC, Pittsburgh PA; Estane® 50 DT3, Estane®58212, Estane®55DT3, Estane®58887, Estane® EZ14-23A, Estane® ETE 50DT3, each commercially available from Lubrizol Company of Cleveland, Ohio; and Elastollan® WY1149, Elastollan®1154D53, Elastollan®1180A, Elastollan®1190A, Elastollan®1195A, Elastollan®1185AW, Elastollan®1175AW, each commercially available from BASF; Desmopan® 453, commercially available from Bayer of Pittsburgh, PA, and the E-Series TPUs, such as D 60 E 4024 commercially available from Huntsman Polyurethanes of Germany.

On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2, 2'-(1,4-phenylenedioxy)diethanol, 1,3-bis-{2-[2-(2-hydroxyethoxy) ethoxy] ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3', 5,5'-tetraethyl-4,4'-diamino-diphenylmethane (i.e., 4,4'-methylene-bis(2,6-diethylaniline), 2,2'-dichloro-3,3', 5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

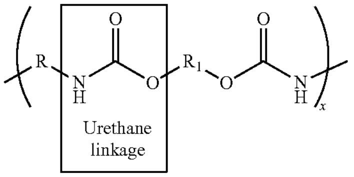

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

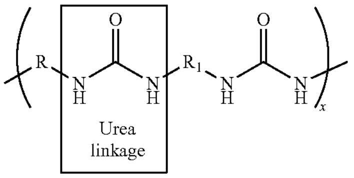

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Thermoplastic polyurea compositions are typically formed by reacting the isocyanate blend and polyamines at a 1:1 stoichiometric ratio. The polyurea prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, those identified above in connection with promoting the reaction between the isocyanate and polyol compounds for producing the prepolymer or between prepolymer and chain-extender during the chain-extending step.

The hydroxyl chain-extending (curing) agents are preferably selected from the same group identified above in connection with polyurethane compositions.

Suitable amine chain-extending (curing) agents that can be used in chain-extending the polyurea prepolymer of this invention include, but are not limited to those identified above in connection with chain-extending the polyurethane prepolymer, as well as 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea-urethane hybrid. Herein, the terms urea and polyurea are used interchangeably.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

Golf balls disclosed herein may have any known overall diameter and include any known number of different layers and layer thicknesses as is required to target desired playing characteristics and performance properties such as hardness, compression, modulus, tensile strength and ultimate elongation, CoR (coefficient of restitution), spin, and/or initial velocity to name a few.

For example, the core may have an overall diameter ranging from about 0.09 inches to about 1.65 inches, or up to about 1.70 inches, or greater than 1.70 inches. The core may in some embodiments have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core has an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

The core generally has an overall compression in the range of from about 40 to about 110, although embodiments are envisioned wherein the compression of the core is as low as 5.

In other embodiments, the overall CoR of cores of the present invention at 125 ft/s is at least 0.750, or at least 0.775 or at least 0.780, or at least 0.785, or at least 0.790, or at least 0.795, or at least 0.810.

The range of thicknesses for an intermediate layer of a golf ball is large because of the vast possibilities when using an intermediate layer, i.e., as an inner cover layer, moisture/vapor barrier layer, film layer, coating layer, etc. Thus, when used in a golf ball disclosed herein, the intermediate layer may have any known thickness such as a thickness of about 0.3 inches or less, or from about 0.002 inches to about 0.1 inches, or of about 0.01 inches or greater.

For example, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

Moisture/vapor barrier layers and/or film layers may have a thickness, for example, of from 0.0003 inches to 0.010 inches.

If the golf ball includes an intermediate layer or inner cover layer, the hardness (material) thereof may be for example about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer may for example be about 0.015 inches to about 0.100 inches, or about 0.020 inches to about 0.080 inches, or about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or inches and an upper limit of 0.050 or 0.060 or 0.070 or 0.075 or 0.080 or 0.090 or 0.100 or or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, or 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer.

It is envisioned that layers the golf ball may be incorporated via any of casting, compression molding, injection molding, or thermoforming as desired.

Those layers of golf balls of the invention comprising conventional thermoplastic or thermoset materials may be formed using a variety of conventional application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entireties.

A method of injection molding using a split vent pin can be found in co-pending U.S. Pat. No. 6,877,974, filed Dec. 22, 2000, entitled "Split Vent Pin for Injection Molding." Examples of retractable pin injection molding may be found in U.S. Pat. Nos. 6,129,881; 6,235,230; and 6,379,138. These molding references are incorporated in their entirety by reference herein. In addition, a chilled chamber, i.e., a cooling jacket, such as the one disclosed in U.S. Pat. No. 6,936,205, filed Nov. 22, 2000, entitled "Method of Making Golf Balls" may be used to cool the compositions of the invention when casting, which also allows for a higher loading of catalyst into the system.

Golf balls of the invention may include at least one compression molded layer. Conventionally, compression molding and injection molding are applied to thermoplastic materials, whereas RIM, liquid injection molding, and casting are employed on thermoset materials. These and other manufacture methods are disclosed in U.S. Pat. Nos. 5,484,870; 5,935,500; 6,207,784; 6,436,327; 7,648,667; 6,562,912; 6,913,726; 7,204,946; 8,980,151; 9,211,662; U.S. Publs. Nos. 2003/0067088; and 2013/0072323; the disclosures of each of which are incorporated herein by reference in their entirety.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. Nos. 5,006,297 and 5,334,673 both also disclose suitable molding techniques that may be utilized to apply the castable reactive liquids employed in the present invention.

However, golf balls of the invention may be made by any known technique to those skilled in the art.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers, and the like.

The solid cores for the golf balls of this invention may be made using any suitable conventional technique such as, for example, compression or injection-molding, Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball sub-assembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold or creating preforms from extrudate. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be subjected to finishing steps such as flash-trimming, surface-treatment, marking, and one or more coating layer may be applied as desired via methods such as spraying, dipping, brushing, or rolling. Then the golf ball can go through a series of finishing steps.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain certain properties in connection with golf balls of the invention and layers thereof.

Hardness. The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

Hardness gradient of an outer core layer may be defined by hardness measurements made at the surface of the outer core layer and at points radially inward towards the geometric center of the inner core, typically at 2-mm increments. In turn, a hardness gradient of the inner core is defined by hardness measurements made at the surface of the inner core and likewise at points radially inward toward the geometric center.

As used herein, the terms "negative" and "positive" hardness gradients refer to the result of subtracting the hardness value at the innermost portion of the component being measured (e.g., the geometric center of a solid inner core in a dual core construction; and the inner surface of an outer core layer; etc.) from the hardness value at the outer surface of the component being measured (e.g., the outer surface of the solid inner core; and the outer surface of the outer core layer, etc.). For example, if the outer surface of the solid inner core has a lower hardness value than does the geometric center (i.e., the surface is softer than the geometric center), the hardness gradient will be deemed a "negative" gradient (a smaller number–a larger number=a negative number). And if the outer surface of the outer core layer has a has a greater hardness value than the inner surface of the outer core layer, this is a "hard-to-soft" or "positive" hardness gradient as measured radially inward from the outer core outer surface. It is also possible to create a "zero" hardness gradient, which is generally defined as no gradient as well as a gradient of less than 1 Shore C hardness point in either the negative or positive hardness gradient direction. Methods for measuring the hardness of the inner core and surrounding layers and determining the hardness gradients are discussed in further detail below.

A positive hardness gradient having a magnitude of from about 1 to about 7 Shore C hardness points generally defines a shallow positive hardness gradient. A positive hardness gradient having a magnitude of greater than about 7 to about 22 Shore C hardness points generally defines a "medium" positive hardness gradient. In turn, positive hardness gradient having a magnitude of more than about 22 Shore C hardness points generally defines a "steep" positive hardness gradient.

A hardness gradient having a magnitude within +1 or −1 Shore C hardness point is generally considered to define a "zero" hardness gradient.

And an outer surface hardness (solid inner core/outer core layer) that is less than the respective geometric center hardness/inner surface hardness by more than about 1 Shore C hardness point is generally considered to define a negative hardness gradient.

Thus, the cores and core layers of golf balls of the invention may have various hardnesses and hardness gradients as known in the golf ball art depending on the particular golf ball playing characteristics being targeted. For example, cores/core layers may have a geometric center hardness and a surface harness such that the hardness difference therebetween is zero or less than 3 Shore C hardness points; or the geometric center hardness may be less than or greater than the surface hardness by up to 7 Shore C; or the surface hardness of the core may be greater than the geometric center hardness to define a positive hardness gradient of about 1 to 12 Shore C hardness points, or of about 12 to 22 Shore C hardness points. However, any known hardness gradient profile can be selected and implemented in golf ball constructions herein. And at least one cover layer may be formed over/about the core.

In any of these embodiments the core may conceivably be replaced with a core having two or more layers wherein at least one core layer has a hardness gradient.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a corexamount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("CoR"). The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Modulus, Tensile Strength and Ultimate Elongation

Modulus, tensile strength and ultimate elongation of golf ball layer materials may be targeted as known in the art. As used herein, "modulus" or "flexural modulus" refers to flexural modulus as measured using a standard flex bar according to ASTM D790-B; tensile strength refers to tensile strength as measured using ASTM D-638; and ultimate elongation refers to ultimate elongation as measured using ASTM D-638.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

It is understood that the system and method of the invention as disclosed, described and illustrated herein represent only some of the many embodiments of the invention. It is appreciated by those skilled in the art that various changes and additions can be made to such system and method without departing from the spirit and scope of this invention. It is intended that all such embodiments be covered by the appended claims.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although systems, methods and golf balls have been described herein with reference to particular parts, means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to the system, method, compositions, constructions, and products without departing from the spirit and scope of this invention. It is intended that all such embodiments be covered by the appended claims.

What is claimed is:

1. A method of making a golf ball, comprising:

providing a subassembly, the subassembly comprising at least one core layer and at least one cover layer comprising a plurality of dimples and having a shape comprising a first pole and an opposing pole;

setting up a first colorant spray gun with first colorant spray gun settings, including a colorant spray gun pressure and a nozzle-to-golf ball distance, to achieve a first degree of coverage;

setting up a second colorant spray gun with second colorant spray gun settings, including a colorant spray gun pressure and a nozzle-to-golf ball distance, to achieve a second degree of coverage; and applying a coating layer to the subassembly, comprising:

spraying, by the first colorant spray gun, a first colorant comprising a first color onto an outer surface of the subassembly at the first pole of the subassembly such that the first colorant provides the first degree of coverage, wherein the first degree of coverage of the first colorant progressively reduces in a first direction from adjacent the first pole toward the opposing pole as a result of the first colorant spray gun settings; and spraying, by the second colorant spray gun, a second colorant comprising a second color that is different than the first color onto the outer surface of the subassembly at the opposing pole of the subassembly such that the second colorant provides the second degree of coverage, wherein the second degree of coverage of the second colorant progressively reduces in a second direction from adjacent the opposing pole toward the first pole as a result of the second settings and thereby partially overlaps the first colorant, wherein the first colorant creates a first color region of the coating layer on the outer surface of the subassembly that includes the first pole and is the first color, and the second colorant creates a second color region of the coating layer on the outer surface of the subassembly that includes the opposing pole and is the second color, wherein the first colorant and the second colorant, in combination as a result of the progressively-reducing first and second degrees of coverage, create a transition color region that is transitionally disposed between the first color region and the second color region and comprises a combination of the first colorant and the second colorant, wherein said combination produces a plurality of transitional colors that are each a spectrophotometer-measurable different color than both the first color and the second color, wherein the transition color region extends circumferentially about the outer surface of the subassembly, and wherein the transition color region: i) has a greater surface coverage of the first colorant than of the second colorant adjacent the first color region; and ii) has a greater surface coverage of the second colorant than of the first colorant adjacent the second color region.

* * * * *